United States Patent Office 2,850,476
Patented Sept. 2, 1958

2,850,476

ACCELERATORS

Nelson V. Seeger, Silver Lake, Cuyahoga Falls, and Thomas G. Mastin, Akron, Ohio, assignors, by mesne assignments, to The Goodyear Tire & Rubber Company, a corporation of Ohio No Drawing. Application September 26, 1955
Serial No. 536,760

5 Claims. (Cl. 260—45.4)

This invention relates to accelerators for cure of synthetic elastomeric polymers. More particularly it relates to methods for and the cured elastomeric polymers resulting from the acceleration of the reaction between polyisocyanates and uncured elastomeric diisocyanate-modified polyesters and polyesteramides such as those described in United States Patents 2,625,532 and 2,625,-535 and in our copending applications Serial Numbers 305,914, filed August 22, 1952, Patent No. 2,777,831; 307,900, filed September 4, 1952, Patent No. 2,760,953. These materials, which are described in detail below, will hereinafter be referred to as uncured elastomeric diisocyanate-modified polyesters.

It has been known to use water and water-liberating compounds, such as salts carrying water of crystallization, in the preparation of cured diisocyanate-modified polyesters. Such materials are known to accelerate the cure of elastomeric diisocyanate-modified polyesters. However, the use of such materials is not entirely satisfactory because the reactions involved produce $CO_2$ gas which causes blisters or bubbles in the cured product. In addition the water reacts with the isocyanate radicals present with the result that more polyisocyanate than that normally required must be added to effect a complete cure.

It is therefore an object of this invention to provide accelerators for the cure of uncured elastomeric diisocyanate-modified polyesters which do not produce the objectionable results obtained by using water or water-liberating compounds. Other objects will appear as the description proceeds.

According to the practice of this invention, the uncured elastomeric diisocyanate-modified polyester, such as those described in the patents and our copending applications referred to above, is mixed with the polyisocyanate required to effect a cure of the elastomer and, in addition, with the accelerator referred to above, this being a condensation product of a primary amine and an aldehyde. The condensation product accelerates the reaction between the —NCO groups of the polyisocyanate and the urethane, urea, or amide linkages present along the molecular chains in the modified polyester and thus effects an accelerated cure with consequent saving of time and increased production from each unit of equipment.

The aldehyde/amine condensation products which have been found useful in the practice of this invention are those resulting from the condensation reaction between approximately one molecular proportion of a primary organic amine with from two to five molecular proportions of an aliphatic aldehyde having a plurality of carbon atoms. These condensation products, usually prepared in the presence of an organic acid catalyst, are generally liquids. Examples of the amines which may be used in the preparation of these condensation products are aniline, butylamine, methylamine, o-toluidine, and diethylamine. Among the aldehydes which are useful in preparing these condensation products may be mentioned propionaldehyde, butyraldehyde, heptaldehyde, and benzaldehyde. Particularly effective condensation products which may be used in the practice of this invention are those resulting from the reaction of approximately 4 mols of butyraldehyde with 1 mol of aniline or with 1 mol of butylamine. Further description of these condensation products and methods for their preparation will be found in United States Patents 1,780,326 and 1,780,334.

The amount of amine/aldehyde condensation product required to accelerate the reaction between the polyisocyanates and the diisocyanate-modified polyester will, of course, vary depending upon the condensation product used and upon the other ingredients used in compounding the elastomer. In general, there may be used as little as 0.05 part or as much as 10 parts of the accelerator by weight per 100 parts of elastomeric polymer by weight. A preferred range is from 0.10 to 2.5 parts by weight per 100 parts of polymer. In general it may be said that the degree of acceleration is proportional to the amount of accelerator used, since, normally, increased amounts of accelerator will reduce the time required to effect a cure. Excessive amounts of these condensation products will produce the acceleration desired, but are sometimes to be avoided either because the time required to effect the cure is so short as to complicate the production operations involved in fabricating a finished article, or because the polymer cured with excess accelerator has undesirable or inferior physical properties.

While each class of the uncured elastomeric diisocyanate-modified polyesters has been fully described in the patents and applications referred to above, the general chemical reactions involved in their preparation may be represented by the following illustrations in which R, R′, and R″ denote divalent organic radicals.

PREPARATION OF POLYESTER (1)
$$n(HO-R-OH) + n(HO-\overset{O}{\underset{\|}{C}}-R'-\overset{O}{\underset{\|}{C}}-OH) \longrightarrow$$

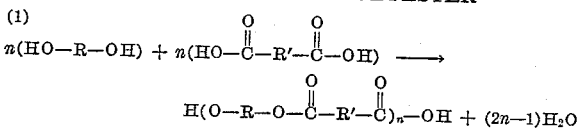

in which $n$ is a positive whole number denoting the degree of polymerization of the polyester formed.

PREPARATION OF POLYESTERAMIDE (2)
$$n(HO-R-NH_2) + n(HO-\overset{O}{\underset{\|}{C}}-R'-\overset{O}{\underset{\|}{C}}-OH) \longrightarrow$$

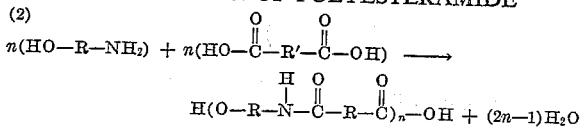

PREPARATION OF UNCURED DIISOCYANATE-MODIFIED POLYESTER (3)
HO-polyester-COOH + OCN—R″—NCO ⟶

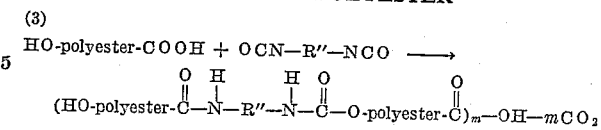

in which $m$ is a positive whole number denoting the number of segments in the diisocyanate-modified, chain-extended polymer.

PREPARATION OF UNCURED DIISOCYANATE-MODIFIED POLYESTERAMIDE (4)
HO-polyesteramide-COOH + OCN—R″—NCO ⟶

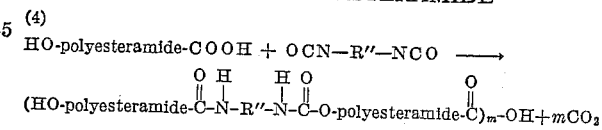

in which $m$ is a positive whole number denoting the number of segments in the diisocyanate-modified, chain-extended polymer.

PREPARATION OF UNCURED DIISOCYANATE-MODIFIED INTERPOLYMERS (5)
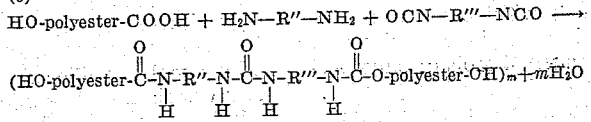

(6)
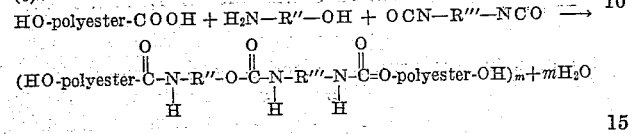

(7)
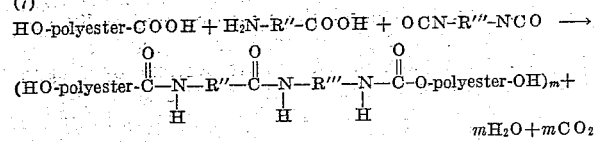

in which R″ and R‴ represent divalent organic radicals and $m$ represents a positive whole number denoting the number of segments in the modified chain-extended interpolymer.

Equations 3, 4, 5, 6 and 7 represent the reactions which may take place in forming the uncured elastomeric polymers according to the limitations as to acid number, hydroxyl number, amino groups, bifunctional additives, and amount of particular diisocyanate used in their preparation, described in our copending applications referred to above.

The curing or cross-linking of the uncured polymers takes place as the result of reaction between the —NCO groups in the curing agent and the reactive hydrogens in certain groups present in the chain of the extended polymer and certain terminal groups at the ends of the chain-extended units. The terminal groups include, of course, hydroxyl, carboxyl, and amino radicals. The groups along the chain include the groups formed by reaction between an —NCO group and a carboxyl, hydroxyl, or amino group, and may be represented as a substitute amide linkage

a carbamic radical

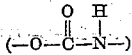

and a ureylene radical

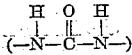

respectively. Each of these groupings has at least one active hydrogen available for reaction with the —NCO group of the polyisocyanate used to effect a cure.

The uncured elastomeric diisocyanate-modified polyesters and polyesteramides described at length in our patents and copending applications referred to above may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyesteramide having a hydroxyl number from 40 to 100 (a preferred range is from 50 to 60) and an acid number from 0 to 7; and (2) at least one diisocyanate selected from the group consisting of 4,4'-diphenyl diisocyanate; 4,4'-diphenylene methane diisocyanate, dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 (a preferred range is from 0.90 to 0.99) mols per mol of polyester or polyesteramide.

Second, the reaction product of (1) a polyester or polyesteramide prepared from at least one dibasic carboxylic acid, and at least one glycol, and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (a preferred range is from 50 to 60) and an acid number from 0 to 12; and (2) at least one tolylene diisocyanate, the diisocyanate being used in an amount ranging from 0.85 to 1.10 (a preferred range is from 0.90 to 1.00) mols per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 (a preferred range is from 50 to 60) and an acid number from 0 to 12; (2) at least one bifunctional additive selected from the group consisting of diamines, amino alcohols, dicarboxylic acids, hydroxy carboxylic acids, amino carboxylic acids and the ureas, guanidines, and thioureas containing a primary amino group, said bifunctional additive being used in an amount such that the total number of —NH$_2$ and —COOH equivalents present in said bifunctional reactant shall be from 0.06 to 0.24 equivalent per mol of polyester, and (3) at least one tolylene diisocyanate, the diisocyanate being used in an amount equal to the sum of from 0.85 mols to 1.10 (a preferred range is from 0.90 to 1.00) mols of diisocyanate per mol of polyester plus the molar amount of diisocyanate equivalent to the mols of said bifunctional additive used.

Fourth, the reaction product resulting from the reaction of a mixture comprising (1) a polyester prepared from bifunctional ingredients including at least one dibasic carboxylic acid containing at least three carbon atoms and at least one glycol, said polyester having a hydroxyl number between 40 and 100 (a preferred range is from 50 to 60) and an acid number from 0 to 7; (2) at least one bifunctional additive from the group consisting of diamines, amino alcohols, dicarboxylic acids, hydroxy carboxylic acids, amino carboxylic acids and the ureas, guanidines, and thioureas containing a primary amino group, said bifunctional additive being used in an amount such that total number of —NH$_2$ and —COOH equivalents present in such bifunctional reactant shall be from 0.06 to 0.48 equivalent per mol of polyester, and (3) at least one diisocyanate selected from the group consisting of 4,4'-diphenyl diisocyanate; 4,4'-diphenylene methane diisocyanate; 4,4'-tolidine diisocyanate, dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 (a preferred range is from 0.90 to 0.99) mol of diisocyanate per mol of polyester plus the molar amount of diisocyanate equivalent to the mols of bifunctional additive used.

Listed below are the reactants used to form some preferred polyesters and polyesteramides which, when prepared and subsequently modified by a diisocyanate or other additive in accordance with the appropriate limitations indicated in the description of the four types of synthetic elastomers, will produce elastomeric products:

(1) Ethylene glycol plus adipic acid.
(2) Propylene glycol 1,2 plus adipic acid.
(3) Ethylene glycol (80 mol percent), propylene glycol 1,2 (20 mol percent) plus adipic acid.

(4) Ethylene glycol (80 mol percent), propylene glycol 1,2 (20 mol percent) plus azelaic acid.
(5) Ethylene glycol (80 mol percent), propylene glycol 1,2 (20 mol percent) plus sebacic acid.
(6) Ethylene glycol (80 mol percent), propylene glycol 1,2 (20 mol percent) plus dilinoleic acid (20 mol percent), adipic acid (80 mol percent).
(7) Ethylene glycol (80 mol percent), glycerine monoethyl ether (20 mol percent) plus adipic acid.
(8) Ethylene glycol (80 mol percent), butylene glycol 1,4 (20 mol percent) plus adipic acid.
(9) Ethylene glycol (80 mol percent), propylene glycol 1,3 (20 mol percent) plus adipic acid.
(10) Ethylene glycol (80 mol percent), pentane diol 1,5 (20 mol percent) plus adipic acid.
(11) Ethylene glycol (80 mol percent), glycerine monoisopropyl ether (20 mol percent) plus adipic acid.
(12) Ethylene glycol (80 mol percent), propylene glycol 1,2 (from 18 to 5 mol percent), ethanol amine (from 2 to 15 mol percent), plus adipic acid.
(13) Ethylene glycol (80 mol percent), propylene glycol 1,2 (20 mol percent) plus maleic acid (from 3 to 6 mol percent), adipic acid (from 97 to 94 mol percent).
(14) Ethylene glycol (80 mol percent), propylene glycol 1,2 (from 19 to 17 mol percent), piperazine (from 1 to 3 mol percent) plus adipic acid.
(15) Ethylene glycol (80 mol percent), propylene glycol 1,2 (from 18 to 5 mol percent), dihydroxyethyl aniline (from 2 to 15 mol percent) plus adipic acid.
(16) Ethylene glycol (80 mol percent), diethylene glycol (20 mol percent) plus adipic acid.
(17) Ethylene glycol (from 90 to 10 mol percent), propylene glycol 1,2 (from 10 to 90 mol percent) plus adipic acid.
(18) Ethylene glycol (from 90 to 10 mol percent), propylene glycol 1,2 (from 10 to 90 mol percent) plus azelaic acid.

The diisocyanates which are preferred when used to form the uncured diisocyanate-modified polyesters and polyesteramides, are 4,4'-diphenyl diisocyanate; 1,5-naphthalene diisocyanate, the meta tolylene diisocyanates such as 2,4- and 2,6-tolylene diisocyanates and 4,4'-diphenylene methane diisocyanate. If meta tolylene diisocyanate is to be used, a convenient method of adding it is in the form of one of its dimers such as the dimer of 2,4-tolylene diisocyanate of the following formula:

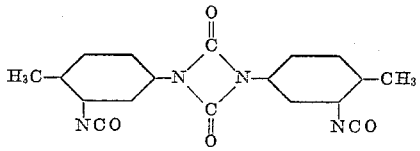

The dimer is less toxic than the monomeric material.

Of the first class of elastomeric polymers described above, those of particular interest are the rubber-like polymers resulting from polyethylene adipate modified by 4,4'-diphenyl diisocyanate, 1,5-naphthalene diisocyanate; 4,4'-diphenylene methane diisocyanate, or mixtures thereof; polypropylene 1,2 adipate modified by 4,4'-diphenyl diisocyanate; 1,5-naphthalene diisocyanate; 4,4'-diphenylene methane diisocyanate, or mixtures thereof; polyethylene (80 mol percent) propylene 1,2 (20 mol percent) adipate modified by 4,4'-diphenyl diisocyanate; 1,5-naphthalene diisocyanate; 4,4'-diphenyl methane diisocyanate, or mixtures thereof; polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof; and polyethylene (80 mol percent) propylene 1,2 (from 19 to 17 mol percent) piperazine (from 1 to 3 mol percent) adipate modified by 4,4'-diphenyl diisocyanate; 1,5-naphthalene diisocyanate; 4,4' - diphenylene methane diisocyanate, or mixtures thereof. These polymers, when cured, have been found to possess outstanding physical properties.

Of the second class of elastomeric polymers described above, those of particular interest are the rubber-like polymers resulting from polyethylene adipate modified by a meta tolylene diisocyanate; polypropylene 1,2 adipate modified by a meta tolylene diisocyanate; polyethylene (80 mol percent) propylene 1,2 (20 mol percent) adipate modified by a meta tolylene diisocyanate; polyethylene (80 mol percent) propylene 1,2 (20 mol percent) azelate modified by a meta tolylene diisocyanate; and polyethylene (80 mol percent) propylene 1,2 (from 19 to 17 mol percent) piperazine (from 1 to 3 mol percent) adipate modified by a meta tolylene diisocyanate.

Mixtures of meta tolylene diisocyanates such as mixtures of 2,4- and 2,6-tolylene diisocyanates may also be used.

Of the third class of elastomeric interpolymers described above, those of particular interest are the rubber-like materials resulting from:

(1) Polyethylene adipate modified by a meta tolylene diisocyanate and by ethylene diamine, tetramethylene diamine, hexamethylene diamine, ethanol amine, benzidine; 4,4'-diamino diphenyl methane or mixtures thereof.

(2) Polypropylene 1,2-adipate modified by a meta tolylene diisocyanate, and by ethylene diamine, tetramethylene diamine, hexamethylene diamine, ethanol amine, benzidine; 4,4'-diamino diphenyl methane or mixtures thereof.

(3) Polyethylene (80 mol percent) propylene 1,2 (20 mol percent) adipate modified by a meta tolylene diisocyanate, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by a meta tolylene diisocyanate, and by ethylene diamine, tetramethylene diamine, hexamethylene diamine, ethanol amine, benzidine; 4,4'-diamino diphenyl methane or mixtures thereof.

Mixtures of meta tolylene diisocyanates such as mixtures of 2,4- and 2,6-tolylene diisocyanates may also be used.

Of the fourth class of elastomeric interpolymers described above, those of particular interest are the rubber-like materials resulting from:

(1) Polyethylene adipate modified by 4,4'-diphenyl diisocyanate; 1,5 - naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(2) Polypropylene 1,2 adipate modified by 4,4'-diphenyl diisocyanate; 1,5-naphthalene diisocyanate; 4,4'-diphenylene methane diisocyanate, or mixtures thereof, and by ethylene diamine tetramethylene diamine, hexamethylene diamine, ethanol amine, benzidine; 4,4'-diamino diphenyl methane or mixtures thereof.

(3) Polyethylene (80 mol percent) propylene 1,2 (20 mol percent) adipate modified by 4,4'-diphenyl diisocyanate; 1,5 - naphthalene diisocyanate; 4,4' - diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine; 4,4'-diamino diphenyl methane or mixtures thereof.

The following examples, in which parts are by weight, are illustrative of the preparation of polyesters and elastomeric diisocyanate-modified polyesters.

Example 1.—Preparation of a typical polyester

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

Example 2.—Preparation of the diisocyanate-modified polymer

A quantity of polyester was prepared from adipic acid, ethylene glycol and propylene 1,2 glycol according to the general method and in substantially the same ratios as shown in Example 1. This polyester had an acid number of 3.1 and a hydroxyl number of 55.6. After heating 2270 parts of this polyester in a steamheated Baker-Perkins mixer to 120° C., 4,4'-diphenyl diisocyanate (280.3 parts of 95.7% purity or 0.96 mols per mol of polyester) was added. After ten minutes of mixing the hot melt was poured into a carnauba wax coated tray and baked for 8 hours at 130° C. The resulting polymer had excellent processing characteristics on a rubber mill. Tests showed the following physical properties—intrinsic viscosity 1.69, percent gel 3.9, and softening point 186° C.

Example 3.—Preparation of the diisocyanate-modified polymer

A quantity of polyester was prepared from adipic acid, ethylene glycol, and propylene glycol 1,2 according to the general method and in substantially the same ratios as shown in Example 1. This polyester had an acid number of 3.1 and a hydroxyl number of 55.6. After heating 200 parts of this polyster to 120° C. in an iron kettle, 2,4-tolylene diisocyanate (20.11 parts of 99.7 purity or 1.10 mols per mol of polyester) was added. After 15 minutes of mixing, the material was poured into a waxed aluminum tray and baked for 8 hours at 120° C. The resulting polymer had excellent processing characteristics on a rubber mill.

A convenient method of determining the effect of using the amine/aldehyde condensation product in accelerating the reaction between the polyisocyanate and the elastomeric diisocyanate-modified polyester is to run a plastic flow test upon the elastomeric compositions. This test comprises extruding the compounded material through an orifice under a constant pressure (1500 pounds per square inch) and at a constant temperature (212° F.) and recording the time (in seconds) required to extrude a given length through said orifice. The time necessary to extrude a given length through the orifice will, of course, increase as the compounded material becomes less plastic and begins to cure or cross-link.

Listed below are plastic flow data showing the results obtained using various tertiary amines as accelerators or catalysts. Recipes are shown in parts by weight.

TABLE I

| Recipe | 1 | 2 | 3 | 4 |
|---|---|---|---|---|
| Elastomer | 100.00 | 100.00 | 100.00 | 100.00 |
| 4,4'-diphenylene diisocyanate | 6.58 | 6.50 | 6.50 | 6.58 |
| Butyraldehyde-aniline condensation product | | 0.10 | 0.15 | 0.25 |
| Plastic flow (in seconds per inch): | | | | |
| 1 hour after milling | 58 | 131 | 250 | 666 |
| 24 hours after milling | 500 | 630 | 2,000 | 2,400 |
| 72 hours after milling | 830 | 1,500 | | |
| 14 days after milling | 1,200 | | | |

The elastomer shown was prepared according to Example 2. The elastomer, diisocyanate, and accelerator were mixed togther on a rubber mill. The samples were aged at room temperature for the indicated time before the plastic flow tests were run. The plastic flow data are expressed in seconds per inch, the tests being run at a pressure of 1500 pounds per square inch and a temperature of 212° F.

Analysis of Table I will indicate that the condensation products function as accelerators for the reaction between the polyisocyanate and the diisocyanate-modified polyester, since the plastic flow results, expressed in seconds per inch, show that the accelerated compounds display increased resistance to flow which indicates that they toughen or cure at a much faster rate than do the un-accelerated compounds.

This application is a continuation-in-part of our co-pending application Serial Number 322,564, filed November 25, 1952, now abandoned.

While certain representative embodiments and details have been shown for the purpose of illustrating the invention, it will be apparent to those skilled in this art that various changes anud modifications may be made therein without departing from the spirit or scope of the invention.

We claim:

1. The method of catalyzing the reaction between an uncured elastomeric diisocyanate-modified polymer and a polyisocyanate which comprises conducting said reaction in the presence of a condensation product resulting from the reaction between approximately one mol of an organic primary amine and selected from the group consisting of aniline, butylamine, methylamine, o-toluidine and diethylamine and from two to five mols of an aliphatic aldehyde having a plurality of carbon atoms and selected from the group consisting of propionaldehyde, butyraldehyde, heptaldehyde, and benzaldehyde, said elastomeric diisocyanate-modified polymer being selected from the group consisting of (A) the reaction product resulting from the reaction of a mixture comprising: (1) a material prepared from bifunctional ingredients including at least one di-carboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total bifunctional reactant, said material having a hydroxyl number from 40 to 100 and an acid number from 0 to 7, and (2) at least one diisocyanate selected from the group consisting of 4,4'-diphenyl diisocyanate; 4,4'- diphenylene methane diisocyanate, dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the reaction product resulting from the reaction of a mixture comprising: (1) a material prepared from bifunctional ingredients including at least one dicarboxylic acid and at least one complementary bifunctional reactant in which the functional groups are selected from the class consisting of the hydroxyl group and the hydrogen-bearing amino groups, the hydrogen-bearing amino groups being present in an amount not to exceed 30% of the total functional groups of said complementary bifunctional reactant, said material having a hydroxyl number from 30 to 140 and an acid number from 0 to 12, and (2) at least one tolylene diisocyanate used in an amount ranging from 0.85 to 1.10 mols per mol of said material; (C) the reaction product resulting from the reaction of a mixture comprising: (1) a polyester prepared from bifunctional ingredients including at least one dicarboxylic acid containing at least three carbon atoms and at least one glycol, said polyester having a hydroxyl number from 30 to 140 and an acid number from 0 to 12, (2) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —$NH_2$ and —COOH equivalents present in said bifunctional reactant shall be from 0.06 to 0.24 equivalents per mol of polyester, and (3) at least one tolylene diisocyanate used in an amount equal to the sum of from 0.85 mols to 1.10 mols of diisocyanate per mol of polyester plus the molar amount of diisocyanate equivalent to the mols of said bifunctional additive used; (D) the reaction product resulting from the reaction of a mixture comprising: (1) a polyester prepared from bifunctional ingredients including at least one dicarboxylic acid containing at least three carbon atoms and at least one glycol, said polyester having a hydroxyl number from 40 to 100 and an acid number from 0 to 7, (2) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH and —COOH equivalents present in said bifunctional reactant shall be from 0.06 to 0.48 equivalents per mol of polyester, and (3) at least one diisocyanate selected from the group consisting of 4,4'-diphenyl diisocyanate; 4,4'-diphenylene methane diisocyanate; 4,4'-tolidine diisocyanate, dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mols to 0.99 mols of diisocyanate per mol of polyester plus the molar amount of diisocyanate equivalent to the mols of bifunctional additive used.

2. The method defined by claim 1 in which the condensation product is formed from approximately four mols of butyraldehyde and approximately one mol of aniline.

3. The method defined by claim 1 in which the condensation product is formed from approximately four mols of butyraldehyde and one mol of butylamine.

4. The method defined by claim 1 in which the elastomeric diisocyanate-modified polymer is one resulting from the reaction of a mixture comprising (A) a polyester prepared from at least one dicarboxylic acid and at least one glycol, said polyester having a hydroxyl number from 30 to 140 and an acid number from 0 to 12 and (B) tolylene diisocyanate used in an amount ranging from 0.90 to 1.00 mol per mol of said polyester.

5. The method defined by claim 1 in which the elastomeric diisocyanate-modified polymer is one resulting from the reaction of a mixture comprising: (A) a polyester prepared from at least one dicarboxylic acid containing at least three carbon atoms and at least one glycol, said polyester having a hydroxyl number from 30 to 140 and an acid number from 0 to 12 (B) a diamine used in an amount such that the total number of —$NH_2$ equivalents is from 0.06 to 0.24 equivalent per mol of polyester and (C) tolylene diisocyanate used in an amount equal to the sum of from 0.90 to 1.00 mol per mol of polyester plus the molar amount of diisocyanate equivalent to the mols of diamine used.

References Cited in the file of this patent

UNITED STATES PATENTS

| | | |
|---|---|---|
| 1,780,326 | Williams et al. | Nov. 4, 1930 |
| 1,780,334 | Burnett | Nov. 4, 1930 |

UNITED STATES PATENT OFFICE
CERTIFICATE OF CORRECTION

Patent No. 2,850,476 September 2, 1958

Nelson V. Seeger et al

It is hereby certified that error appears in the printed specification of the above numbered patent requiring correction and that the said Letters Patent should read as corrected below.

Column 4, line 52, for "that total number" read -- that the total number --; column 5, line 68, for "ment)" read -- cent) --; column 6, line 1, for "curved" read -- cured --.

Signed and sealed this 11th day of November 1958.

(SEAL)

Attest:
KARL H. AXLINE
Attesting Officer

ROBERT C. WATSON
Commissioner of Patents